United States Patent [19]

Plum

[11] 4,323,218
[45] Apr. 6, 1982

[54] INFLATABLE CORE FOR USE IN FORMING A THERMAL BREAK IN A METAL FRAME FOR A DOOR OR WINDOW

[75] Inventor: Douglas B. Plum, Nazeing, England

[73] Assignee: E & E Kaye Limited, England

[21] Appl. No.: 180,417

[22] Filed: Aug. 22, 1980

[51] Int. Cl.³ .......................... B29C 1/12; B29C 27/00
[52] U.S. Cl. ................................... 249/65; 49/DIG. 1; 52/403; 249/122; 249/127; 264/261; 264/314; 425/417
[58] Field of Search ..................... 49/DIG. 1, DIG. 2; 52/403, 731, 393, 402; 29/460, 463; 264/261, 314; 425/110, 416, 417, DIG. 14, DIG. 19, DIG. 44, 127, 368, 389, 405 R, 406, , 467; 249/65, 178, 115, 180, 183

[56] References Cited

U.S. PATENT DOCUMENTS

| | | | |
|---|---|---|---|
| 2,239,989 | 4/1941 | Britton | 425/DIG. 44 |
| 2,652,168 | 9/1953 | Nelson et al. | 249/65 |
| 3,116,521 | 1/1964 | Taccone | 425/DIG. 19 |
| 3,204,324 | 9/1965 | Nilsen | 49/DIG. 1 |
| 4,096,678 | 6/1978 | Diels et al. | 49/DIG. 1 |
| 4,150,713 | 4/1979 | Mio | 249/65 |

FOREIGN PATENT DOCUMENTS 2302178 10/1976 France ................................. 249/65

Primary Examiner—Willard E. Hoag
Attorney, Agent, or Firm—Kenyon & Kenyon

[57] ABSTRACT

An inflatable core for use in forming a thermal break in a metal frame for a door and/or window by moulding and curing thermal barrier material, such as resin, in two parallel, laterally spaced, elongate gaps defined between respective pairs of confronting elongate surfaces of the inner and outer frame elements which when assembled form a box-section member. The gaps are converted into respective mould cavities for the resin by the pressure of shoes against the elements adjacent the respective gaps to close one side thereof, the shoes being removed only after the resin has cured to leave the finished thermal break. The shoes are carried on opposite walls of a laterally expansible tube which is inserted into the box-section and is expanded to press "non-stick" surfaces of the shoes against the respective gaps ready for the moulding and curing of resin therein, while maintaining the gap dimensions. After curing of the resin, the tube is contracted laterally to disengage the shoes and is then withdrawn to leave the finished thermal break.

9 Claims, 9 Drawing Figures

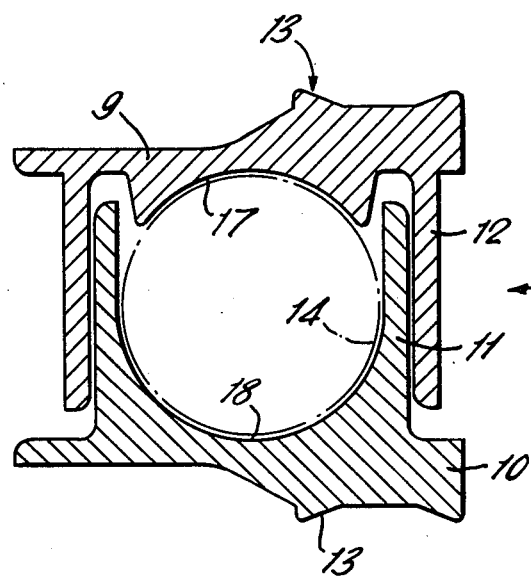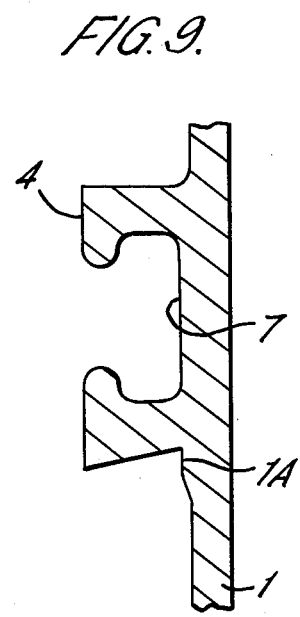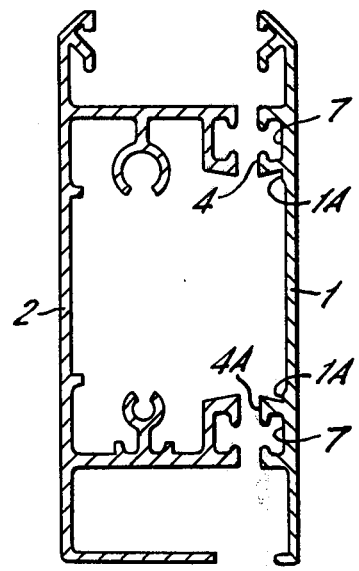

INFLATABLE CORE FOR USE IN FORMING A THERMAL BREAK IN A METAL FRAME FOR A DOOR OR WINDOW

BACKGROUND OF THE INVENTION

1. Field of the Invention

This invention relates to metal window and/or door frames, and particularly to a frame incorporating a thermal break disposed between the inner and outer parts of a frame.

2. Description of the Prior Art

Metal extrusions, particularly aluminum extrusions, are widely used in the construction of door and/or window frames, because of the advantages afforded by the strength, ease of maintenance etc. of the finished construction. However, the thermal properties of the metal tend to result in the formation of condensation when one part of the frame is subjected to lower temperatures than are experienced by another part of the frame, e.g. by the side of a door frame exposed to the exterior of a building which tends to be colder than the inner side exposed to the building interior. To combat this, a thermal break is provided between the two parts of the frame, being in the form of a layer of thermal barrier material, usually a rigid resin, which connects the two parts of the frame so that there is no direct metal-to-metal contact between them.

One widely used method of constructing a thermal break is illustrated in FIGS. 1 and 2 of the accompanying drawings, and involves the use of a one-piece aluminium extrusion which comprises the outer element 1 of the frame and the inner element 2 of the frame, the elements 1 and 2 having respective confronting surfaces 3 and 4 which are spaced apart by a thin web 5 which at this stage connects the elements 1 and 2. In other words, there is formed between the elements 1 and 2 a shaped channel of which the walls are defined by the confronting surfaces 3 and 4, and the web 5. The shaped channel is then filled with a resin material, and when this has cured and thus rigidified, the base of the channel constituted by the web 5 is removed by a machining operation to leave the construction shown in FIG. 2 where the resin material 6 constitutes the sole connection between the parts 1 and 2. Conveniently the surfaces 3 and 4 are undercut as shown at 7, to provide a secure connection between the resin material 6 and the elements 1 and 2.

Although the method described above is suitable to produce a construction such as that shown in FIG. 2, there is a need for a box-like construction such as that shown in FIG. 3 of the accompanying drawings, where the elements 1 and 2 are connected by a thermal break comprising two parallel strips of resin 6 and 6A, disposed in opposite side walls of a box-like section. Frequently this box-like construction is required in lengths of up to 5 meters, and it will be readily appreciated therefore that if the method described with reference to FIGS. 1 and 2 is applied to the box-like construction, the appearance of the construction after the formation of the thermal breaks 6 and 6A would be as is shown in FIG. 4 of the accompanying drawings, requiring a difficult if not impossible machining operation to remove the unwanted webs 5 and 5A inside the box section.

The object of the present invention is to provide a method of forming a thermal break which does not require the subsequent removal of unwanted metal webs, and apparatus for performing this method, which is therefore particularly suitable for the production of the box-like construction shown in FIG. 3 of the accompanying drawings.

SUMMARY OF THE INVENTION

According to one aspect of the present invention, there is provided a method of forming a thermal break between two elongate elements of a metal frame comprising the steps of a method of forming a thermal break between two elongate elements of a metal frame, comprising the steps of assembling said two elements so that two parallel, laterally spaced elongate surfaces on one of the elements respectively confront two corresponding parallel, laterally spaced elongate surfaces on the other element to define therebetween two parallel elongate gaps of predetermined dimensions, the assembled elements forming a box-section elongate member with said elongate gaps disposed in opposite elongate side walls thereof; closing off one open elongate side of each of the gaps to form a respective elongate mould cavity by disposing within the box-section member a pair of elongate shoes which are each aligned with the inner open elongate side of a respective one of said elongate gaps, and moving the shoes simultaneously apart in an outward lateral direction thereby to press each shoe into engagement with said elements adjacent the respective gap to form said respective mould cavity; filling the mould cavities thus formed with a thermal barrier material; curing said thermal barrier material in said mould cavities; and disengaging said shoes from said elements by moving the shoes relatively laterally towards each other before withdrawing them from the box-section member, thereby leaving said cured thermal barrier material to constitute a thermal break connecting said elements.

For convenience, before their insertion in the box-section member, the shoes are preferably mounted on opposite exterior sides of an elongate tube, the tube being expansible, in a single lateral direction such that when the tube and the shoes are disposed within the box-section member with the shoes aligned with said gaps as aforesaid, lateral expansion of the tube in said single lateral direction presses the shoes against said elements to close off said inner open sides of the gaps, lateral contraction of the tube serving to disengage said shoes from said elements.

The expansion of the tube and its contraction may be accomplished in any suitable manner, for example using pneumatic or hydraulic pressure operated means; for example, an elongate flexible bag may be disposed inside the tube, means being provided for varying the pressure inside the bag as required.

BRIEF DESCRIPTION OF THE DRAWINGS

FIG. 8 of the accompanying drawings shows a modified pair of sections to be assembled with the thermal break therebetween; and FIG. 9 is a "Blown-up" view of part of one of the sections shown in FIG. 8.

DESCRIPTION OF THE PREFERRED EMBODIMENTS

Figure 1:
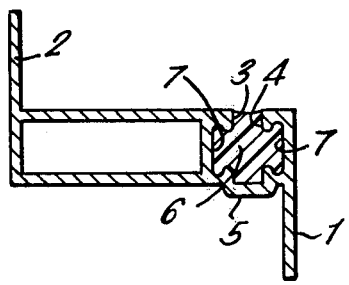
FIGS. 1 and 2 show various stages in the construction of a thermal break according to a known method, as described hereinabove.

It should be noted that throughout the Figures of the drawings, like parts are indicated by like reference numerals, for easy identification.

Figure 2:
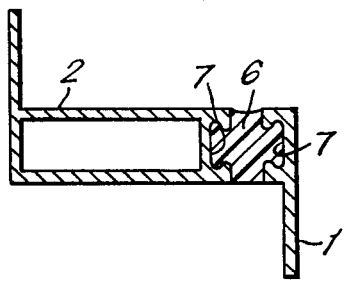
Figure 3:
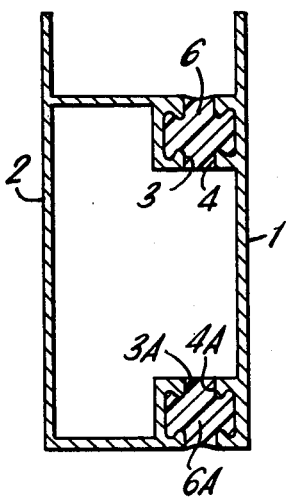
FIG. 3 shows a cross-sectional view of a typical box-section member incorporating a thermal break.
Figure 4:
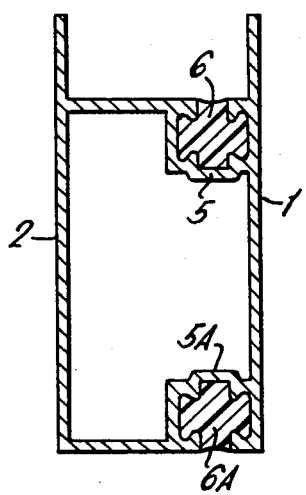
FIG. 4 shows an intermediate stage in the construction of a box-section member such as that shown in FIG. 3, using a similar method to that used in FIGS. 1 and 2.

The known method of forming a thermal break comprising a single strip of resin material, as shown in FIGS. 1 and 2, has already been described herein, as well as the difficulties in adapting this method in producing a thermal break in a box-section member requiring two closely spaced parallel strips of resin material, as shown in FIG. 3.

Figure 5:
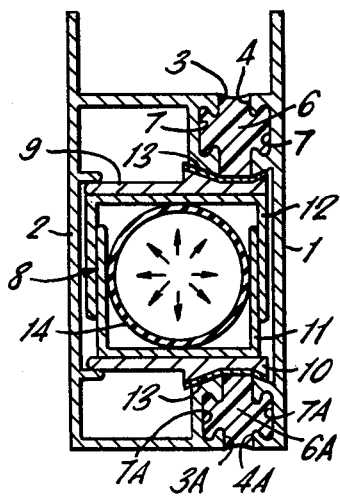
FIG. 5 shows an embodiment of apparatus according to the invention at an intermediate stage during the construction of a box-section member incorporating a thermal break such as that shown in FIG. 3.
Figure 6:
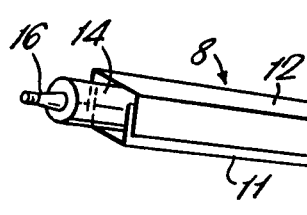
FIG. 6 shows a perspective view of the expansible tube and pressure bag used in the apparatus shown in FIG. 5, FIG. 7 of the drawings shows an alternative construction of expansible tube.

Considering FIGS. 5 and 6, according to a preferred embodiment of the present invention, an elongate box-section member is formed by assembling two independent metal extrusions, here shown as elements 1 and 2, alongside one another, with respective pairs of confronting surfaces 3,4 and 3A,4A defining respective elongate gaps between the elements 1 and 2, the gaps being located in the side walls of the box-section member. Each surface 3, 3A, 4 and 4A is preferably undercut as before as shown at 7. A jig comprised of an expansible tube 8 is inserted between the elements 1 and 2, so that respective shaped shoes 9 and 10 or mold base means carried on opposite sides of the tube 8 are aligned with the inner open sides of the gaps between the pairs of surfaces 3,4 and 3A,4A.

The tube is constructed from two elongate channel members 11 and 12, which are nested together in the manner illustrated in FIGS. 5 and 6, to form the tube which is open at both ends, and which is expansible in one lateral direction only by relative lateral sliding movement of channel member 11 into and out of channel member 12. The shoes 9,10 are mounted on the sides of the tube formed by the base walls of the respective channel members 12 and 11. It will be seen that with this construction of the tube 8, the exterior dimension of the tube in a lateral direction perpendicular to the direction of the relative sliding movement between the channel members 11 and 12 remains substantially constant during expansion and contraction of the tube, so that the tube 8 can be used to maintain the desired gap width once it is inserted within the box-section member.

Once the tube is inserted in the box-section member with the shoes aligned as illustrated in FIG 5, the tube is expanded in a manner described in detail below, to press the shoes into engagement with the elements 1 and 2 adjacent the inner sides of the respective gaps, so that each shoe closes off one side of the respective gap, and converts it into a mould cavity into which the thermal barrier resin material can be injected. Because the resin is introduced into the mould cavities as a fluid, the elements 1,2 are first arranged so that one of the mould cavities is uppermost, and the resin is poured into this mould cavity. After a few minutes, when the resin has hardened sufficiently, the elements 1,2 are turned over so that the other mould cavity can be filled with resin also. The resin 6,6A in each mould cavity is allowed to set i.e. cure, after which the shoes are retracted from the elements 1,2 by contraction of the tube 8, after which the tube 8 and the shoes 9,10 are removed from the now completed box-section.

Preferably the surfaces 13 of the shoes 9,10 which engage the elements 1 and 2 and which constitute the respective mould cavities are hollow, each surface having a flat base with very shallow inclined side walls rising therefrom constituting locating means. The surfaces of the elements 1 and 2 which the inclined side walls engage are correspondingly under-cut to facilitate the correct relative locations of the elements 1 and 2 during filling and curing of the resin 6, 6A within the mould cavities. To facilitate the ready removal of the shoes 9,10 from the cured resin material, the surfaces 13 are preferably "non-stick", being for example treated with a coating of PTFE or silicone.

The relative movement produced between the shoes 9 and 10 during their engagement with and disengagement from the elements 1 and 2 during the method described above, can be achieved in any suitable way. In the embodiment illustrated in FIGS. 5 and 6, where the shoes are mounted on the expansible tube, expansion and contraction of the tube may be performed by for example a mechanical linkage, or a series of opposed inclined planes, or, as in the illustrated embodiment, using hydraulic or pneumatic pressure operated means, preferably the latter. In the illustrated embodiment, an elongate pressure bag 14, having a closed end 15 and a valve 16 located in its opposite end is disposed within the tube 8. The pressure inside the bag is suitably varied to produce the desired contraction and expansion of the tube 8, whether using positive or negative air pressure inside the bag to produce expansion of the tube.

FIG. 7 shows an alternative expansible tube construction in which the shoes 9, 10 are formed integrally with the channel members 11 and 12 respectively. Also the inner sides of the bases of the channel members are formed with part cylindrical seats 17, 18 to support the elongate pressure bag (not shown).

The elements are otherwise substantially the same as the elements previously described. The method of use of the expansible tube is likewise similar to the method used for the tube described earlier except that since the shoes 9, 10 are formed integrally with the channels, the tube as a whole is inserted in and extracted from the sections being assembled.

FIG. 8 of the drawing shows an alternative pair of sections to be assembled with a thermal break between the sections. The sections are generally similar to the elements 1 and 2 previously described and like parts have been allotted the same reference numerals. As previously described, the sections have confronting surfaces 3, 4 and 3A, 4A defining respectively the elongate gaps between the elements 1 and 2 to be filled with a resin to bond the two elements together whilst providing a thermal break between the elements. The expansible tube 8 to be inserted between the elements is intended to be a close sliding fit between the elements and the wall of the element 1 between the surfaces 4 is formed on the inner side thereof with raised lands 1A immediately adjacent the surfaces (see FIG. 9) against which the outer ends of the integral shoes on the channel members 11, 12 engage whilst holding the elements 1 and 2 for the filling of the gaps 4, 4A. As best seen in the enlarged view 9A of the drawings, the land 1A merges with the rest of the wall of the section through a shallow inclined ramp. When the resin in the gaps 4, 4A has set and it is desired to remove the expansible tube and shoes, the inflatable bag is de-flated and the sections 11, 12 of the tube are pressed towards each other. Once the outer ends of the tube are thus retracted from the lands 1A the tube should then be sufficiently loose between the sections 1 and 2 to be readily extracted. The provision of the lands enables the tube to be loosened between the sections even though the sections may be have been drawn towards each other slightly by the setting of the resin in the gaps 4, 4A which may contract slightly on setting. The provision of the ramps leading up the lands assists in guiding the corners of the expandible tube into engagement with the lands immediately adjacent the surfaces 4, 4A when the tube is expanded to hold the sections for filling of the gaps. The arrangement is otherwise similar to that previously described.

What is claimed is:

1. A jig for use in securing two elongate sections together by two spaced thermal barriers to form a hollow member, comprising a pair of elongate members to be located side-by-side within the sections between the locations where the thermal barriers are formed, each elongate member having mould base means extending along an outer side thereof to form with spaced opposing parts of the two elongate sections, mould cavities to receive thermal barrier material means to expand the pair of members of the jig laterally to engage the mould base means with the sections to form the required mould cavities and locating means on the members of the jig for engaging co-operating locating means on the sections on either side of the mould cavities to adjust the spacing of the sections in response to said lateral expansion of the jig to a requisite distance to create, after filling of the mould cavities with thermal barrier material, a hollow member of the required cross-sectional size.

2. A jig as claimed in claim 1 wherein the elongate members are adapted to locate between a pair of spaced abutments on one of the elongate sections to prevent lateral expansion of the members beyond the position in which the sections will have reached their required spacing as determined by the locating means.

3. A jig as claimed in claim 1 wherein the mould base means are formed on elongate shoes separate from and lying in abutment with the laterally expansible elongate members.

4. A jig as claimed in claim 1 wherein the surfaces of the base means are coated with "non-stick" material to facilitate release of the jig from the pair of sections after formation of the thermal barriers between the sections.

5. A jig as claimed in claim 1 wherein the locating means on the members of the jig for adjusting the spacing of the sections comprise inclined face means disposed on either side of the base means for engaging corresponding inclined faces on the two sections.

6. A jig as claimed in claim 5 wherein the inclined face means rise above the base means on either side thereof.

7. A jig as claimed in claim 1 wherein the elongate members comprise two elongate U-shaped channel members assembled with the side walls of one channel member extending into the other channel member and means being provided within the channels to act on the bases thereof to effect lateral expansion of the channels with respect to each other.

8. A jig as claimed in claim 7 wherein the means to expand the members comprise an elongate flexible bag disposed between said channels and means for inflating the bag and releasing pressure from the bag for expansion and contraction of the members.

9. A jig as claimed in claim 8 wherein the elongate flexible bag is circular in cross section and each channel section has a part cylindrical bearing surface at the base thereof against which the circular bag bears.

* * * * *